United States Patent [19]

Summerville

[11] Patent Number: 4,822,285
[45] Date of Patent: Apr. 18, 1989

[54] ANATOMICALLY STUFFED TOY ANIMAL

[76] Inventor: Stephan W. Summerville, 7149 Mariposa Ave., Citrus Heights, Sacramento, Calif.

[21] Appl. No.: 154,589

[22] Filed: Feb. 10, 1988

[51] Int. Cl.$^4$ .......................... G09B 23/34; A63H 3/02
[52] U.S. Cl. ...................................... 434/272; 446/369
[58] Field of Search ................. 434/272; 446/268, 369

[56] References Cited

U.S. PATENT DOCUMENTS

| | | | |
|---|---|---|---|
| 2,288,296 | 6/1942 | Munro | 434/272 |
| 2,678,505 | 5/1954 | Munson | 434/272 |
| 2,971,272 | 2/1961 | Barlow | 434/272 |
| 2,988,823 | 6/1961 | Rosenbloom | 434/272 |
| 3,009,267 | 11/1961 | Bezark | 434/272 |
| 3,715,816 | 2/1973 | White | 434/260 |
| 3,999,309 | 12/1976 | Gonzalez | 434/272 |
| 4,197,670 | 4/1980 | Cox | 434/273 |
| 4,288,222 | 9/1981 | Kling | 434/272 |

*Primary Examiner*—William H. Grieb
*Attorney, Agent, or Firm*—Jerry T. Kearns

[57] ABSTRACT

A stuffed toy animal has an abdominal cavity which is covered by a flap. The flap may be secured in a closed position through the use of a zipper or by VELCRO fasteners. Stuffed fabric internal organs are removably received in the abdominal cavity. These stuffed organs are retained in anatomically correct positions through the use of cooperating VECRO fasteners. VELCRO fasteners are also provided on the exterior surface of the abdominal flap for displaying the various stuffed organs in anatomically correct relative positions for educational purposes. In a second embodiment, the abdominal flap is reversible, having one side imprinted with indicia, designating the anatomically correct locations of the various organs. The flap has one surface which matches the exterior surface of the fabric covering on the remainder of the stuffed toy animal. The other surface of the flap is provided with the organ location indicia and with VELCRO fasteners for cooperation with VELCRO fasteners on each organ. By selectively reversing the abdominal cavity flap, the correct relative locations of the organs may be externally displayed or the abdominal cavity may be concealed to provide an appearance of a conventional stuffed toy animal. An additional hollow cavity in the head of the stuffed toy animal is provided with an audio educational tape playing device.

8 Claims, 5 Drawing Sheets

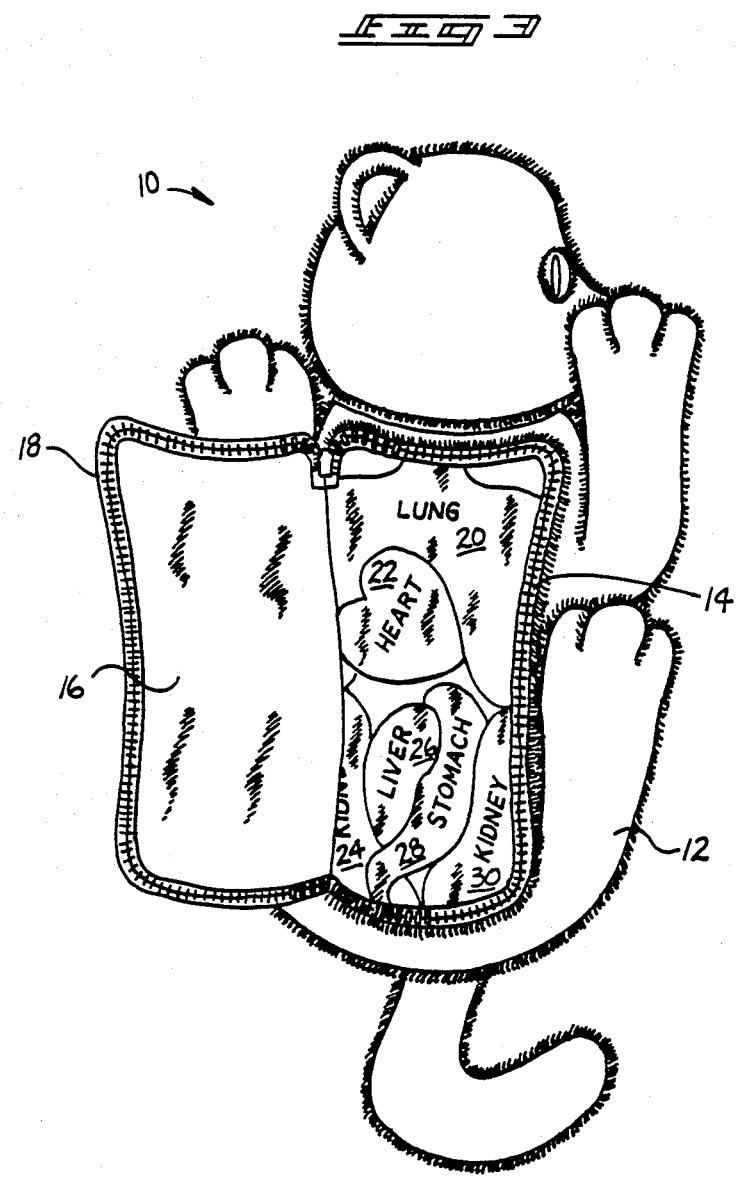

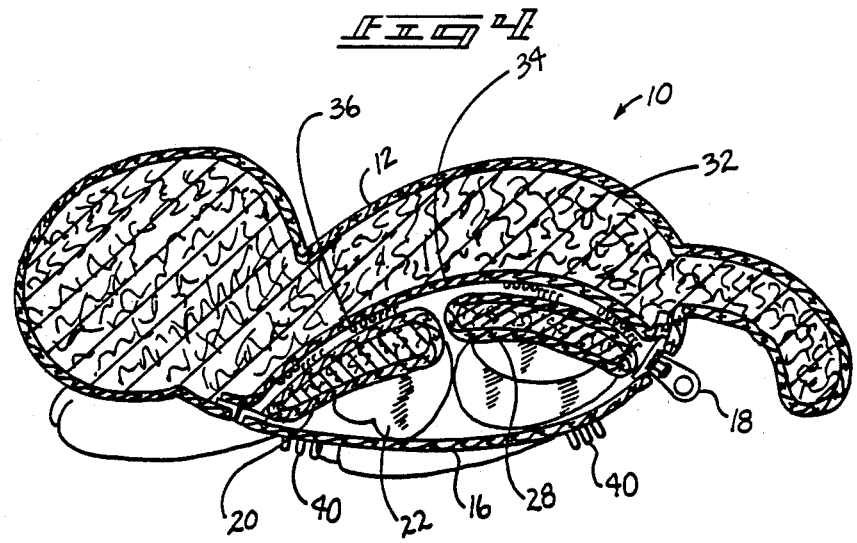
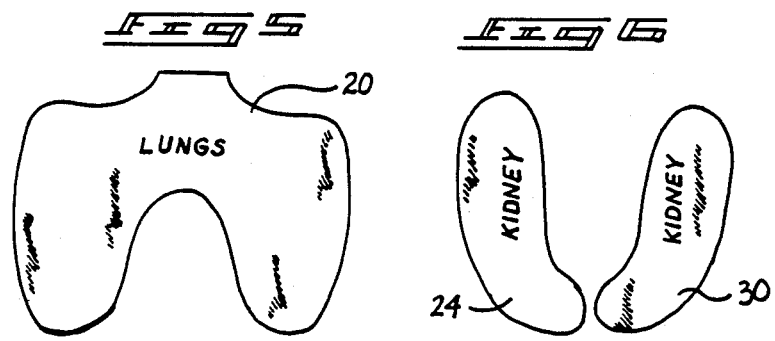
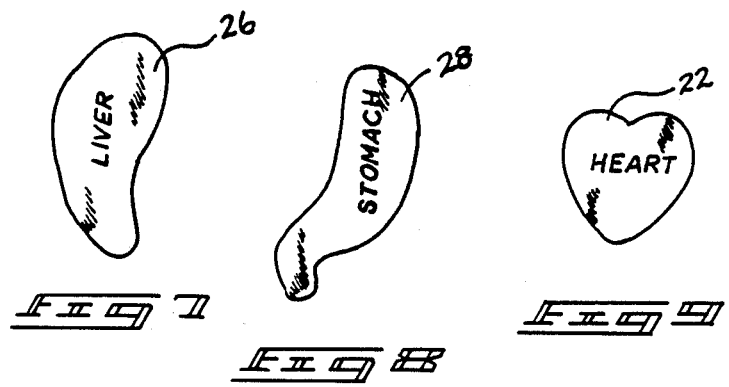

ANATOMICALLY STUFFED TOY ANIMAL

BACKGROUND OF THE INVENTION

1. Field of the Invention

The present invention relates to stuffed toy animals, and more particularly pertains to stuffed toy animals provided with an abdominal cavity which removably receives stuffed fabric representations of various internal organs in their anatomically correct locations. Children are highly attracted to stuffed animals because of their soft exterior and their aesthetic visual appearances. Likewise, children are equally attracted to live animals such as pet cats and dogs. Children often associate such living pet animals with inanimate stuffed toy animals. As a result, many times these living pet animals are treated roughly or otherwise mishandled by young children. This mistreatment can result in injury to the animal and may also cause injury to the children if the animal becomes frightened and scratches or bites the child. In order to overcome these problems, the present invention provides an anatomically correct stuffed toy animal which is designed as an educational device to teach children that animals are not just toys, rather, they have many of the same physiological characteristics as humans and should be treated like a human friend.

2. Description of the Prior Art

Various types of anatomically constructed dolls for educational purposes are known in the prior art. A typical example of such a doll is to be found in U.S. Pat. No. 2,288,296, which issued to H. Munro on June 30, 1942. This patent discloses an educational doll for providing surgery instruction which is formed as a hollow rubber shell provided with various internal organs. U.S. Pat. No. 2,678,505, which issued to H. Munson on May 18, 1954, discloses a doll for playing at surgery which has a hollow abdominal cavity which is covered by a pair of flaps. The flaps are provided with a row of apertures along their side edges for stitching these flaps in a closed position. Various internal organs are located in their approximate anatomically correct locations within the cavity by registry of a peg on each of the organs with a hole on an internal wall of the cavity. U.S. Pat. No. 3,715,816, which issued to E. White on Feb. 13, 1973, discloses an amusement book for children including pages having animal representations provided with means for releasably receiving the animal's natural food and with a natural food storage habitat representation. U.S. Pat. No. 4,197,670, which issued to Z. Cox on Apr. 15, 1980, discloses an educational toy stuffed doll having a fabric cover. The doll includes a trunk and attached body appendages. The trunk has a hollow cavity adapted to be closed by a hinged fabric door. A baby doll is removably carried within the cavity. VELCRO fasteners are located at selected positions on the doll for attaching the baby doll to the main doll body. U.S. Pat. No. 4,288,222, which issued to J. Kling on Sept. 8, 1981, discloses a rag doll provided with a hollow body cavity accessible by a zipper closed opening located in the front of the doll. A simulated rib cage is located in the upper portion of the body cavity and simulated stuffed replicas of the major body organs are located within the cavity. The various organs are located in their approximately anatomically correct position within the body cavity and secured in the body cavity and or to each other by means of snap fasteners. The organs are completely removably from the body cavity for instructional purposes.

While the above mentioned devices are suited for their intended usage, none of these devices provide a stuffed toy animal having an abdominal cavity closed by a zippered flap provided with external VELCRO fasteners for displaying stuffed representations of the animal's internal organs. Additionally, none of the aforesaid prior art devices disclose a stuffed animal provided with a reversible flap on which indicia are printed on one side for properly locating stuffed representations of the animal's internal organs in their approximately anatomically correct locations. Inasmuch as the art is relatively crowded with respect to these various types of stuffed dolls and toy animals, it can be appreciated that there is a continuing need for and interest in improvements to such stuffed toy animals, and in this respect, the present invention addresses this need and interest.

SUMMARY OF THE INVENTION

In view of the foregoing disadvantages inherent in the known types of stuffed toy animals now present in the prior art, the present invention provides an improved anatomically stuffed toy animal. As such, the general purpose of the present invention, which will be described subsequently in greater detail, is to provide a new and improved anatomically stuffed toy animal which has all the advantages of the prior art stuffed toy animals and none of the disadvantages.

To attain this, representative embodiments of the concepts of the present invention are illustrated in the drawings and make use of a stuffed toy animal which has an abdominal cavity which is covered by a flap. The flap may be secured in a closed position through the use of a zipper or by VELCRO fasteners. Stuffed fabric internal organs are removably received in the abdominal cavity. These stuffed organs are retained in anatomically correct positions through the use of cooperating VELCRO fasteners. VELCRO fasteners are also provided on the exterior surface of the abdominal flap for displaying the various stuffed organs in anatomically correct relative positions for educational purposes. In a second embodiment, the abdominal flap is reversible, having one side imprinted with indicia, designating the anatomically correct locations of the various organs. The flap has one surface which matches the exterior surface of the fabric covering on the remainder of the stuffed toy animal. The other surface of the flap is provided with the organ location indicia and with VELCRO fasteners for cooperation with VELCRO fasteners on each organ. By selectively reversing the abdominal cavity flap, the correct relative locations of the organs may be externally displayed or the abdominal cavity may be concealed to provide an appearance of a conventional stuffed toy animal. An additional hollow cavity in the head of the stuffed toy animal is provided with an audio educational tape playing device.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved anatomically stuffed toy animal which has all the advantages of the prior art stuffed toy animals and none of the disadvantages.

It is another object of the present invention to provide a new and improved anatomically stuffed toy animal which may be easily and efficiently manufactured and marketed.

It is a further object of the present invention to provide a new and improved anatomically stuffed toy animal which is of a durable and reliable construction.

An even further object of the present invention is to provide a new and improved anatomically stuffed toy animal which is susceptible of a low cost of manufacture with regard to both materials and labor, and which accordingly is then susceptible of low prices of sale to the consuming public, thereby making such stuffed toy animals economically available to the buying public.

Still yet another object of the present invention is to provide a new and improved anatomically stuffed toy animal which provides in the apparatuses and methods of the prior art some of the advantages thereof, while simultaneously overcoming some of the disadvantages normally associated therewith.

Still another object of the present invention is to provide a new and improved anatomically stuffed toy animal for teaching children the anatomical nature of living animals.

Yet another object of the present invention is to provide a new and improved anatomically stuffed toy animal which provides an appealing amusement and educational device for instructing children on the anatomical characteristics and proper treatment of living animals.

Even still another object of the present invention is to provide a new and improved anatomically stuffed toy animal anatomically stuffed toy animal provided with a hollow abdominal cavity in which stuffed fabric representations of the animal's various internal organs are removably received.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view of the stomach of the anatomically stuffed toy animal according to the first embodiment of the present invention, with the abdominal cavity flap in an open position.

FIG. 4 is a longitudinal cross sectional view illustrating the internal construction of the anatomically stuffed toy animal according to the first embodiment of the present invention.

FIG. 5 is a front view of a stuffed fabric representation of the animal's lungs.

FIG. 6 is a front view of stuffed fabric representations of the animal's kidneys.

FIG. 7 is a front view of a stuffed fabric representation of the animal's liver.

FIG. 8 is a front view of a stuffed fabric representation of the animal's stomach.

FIG. 9 is a front view of a stuffed fabric representation of the animal's heart.

DESCRIPTION OF THE PREFERRED EMBODIMENT

Figure 1:
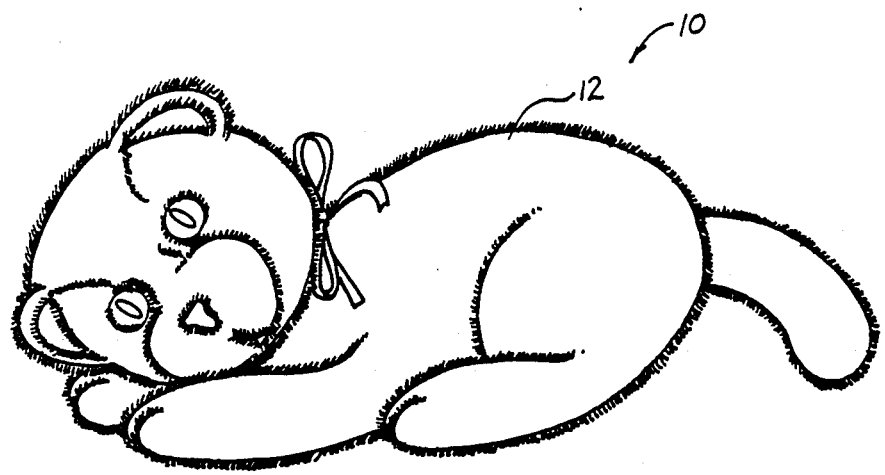
FIG. 1 is a side view of an anatomically stuffed toy animal according to the first embodiment of the present invention.

With reference now to the drawings, and in particular to FIG. 1 thereof, a new and improved anatomically stuffed toy animal embodying the principles and concepts of the present invention and generally designated by the reference numeral 10 will be described.

More specifically, it will be noted that the first embodiment 10 of the invention includes a body portion 12. The body portion 12 may be in the shape of any desired animal such as a cat, dog, squirrel, etc. The body 12 of the stuffed toy animal is formed in a conventional fashion by providing a fabric covering stuffed with a filler material. The fabric covering and filler material may be of any conventional form without departing from the scope of the present invention.

Figure 2:
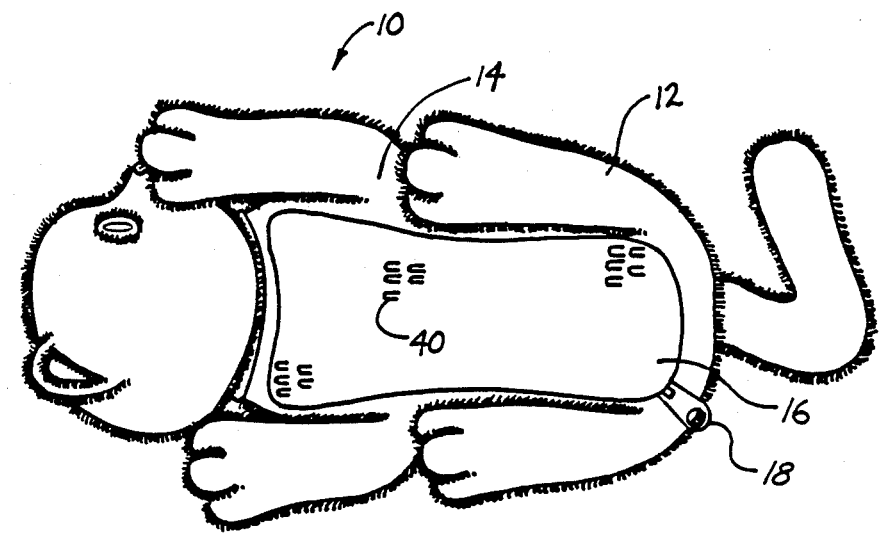
FIG. 2 is a bottom view of the stomach of the anatomically stuffed toy animal according to the first embodiment of the present invention.

In FIG. 2, a view of the stomach side of the body 12 of the stuffed animal 10 according to the first embodiment of the present invention is provided. The body 12 of the stuffed animal 10 has a hollow abdominal cavity which is covered by a flap 16 which may be selectively opened or closed by a conventional zipper 18. A plurality of loop VELCRO fasteners are provided on the outer surface of the abdominal flap 16. The loop fasteners 40 may be positioned in predetermined locations or may cover the entire surface of the flap 16.

With reference now to FIG. 3, a view of the stomach side of the stuffed toy animal 10 with the flap 16 in an open position is provided. A plurality of stuffed representations of the internal organs of a real animal are removably retained in the hollow abdominal cavity of the body 12. These stuffed organs include lungs 20, a heart 22, a first kidney 24, a liver 26, a stomach 28 and a second kidney 30. Other representations of internal organs may also be received within the hollow abdominal cavity without departing from the scope of the present invention. For example, stuffed representations of the intestines, spleen, appendix, diaphragm, etc. may also be provided. These various stuffed internal organs are removably retained in their approximate anatomically correct locations within the body 12 by cooperating VELCRO fasteners on the back of each of the organs and on the inner wall of the abdominal cavity. Thus, these various stuffed organs may be selectively removed and replaced for educational purposes.

In FIG. 4, a longitudinal cross sectional view of the anatomically stuffed toy animal 10 according to the first embodiment of the present invention is provided. The body 12 of the animal has a major portion stuffed with a conventional filler material 32. A hollow abdominal cavity is formed by an inner partition wall 34 within the body 12. The outer surface of the partition wall 34 is provided with a plurality of spaced loop VELCRO fasteners 36 at predetermined locations, for cooperation with hook VELCRO fasteners 38 provided on the back surface of each of the stuffed organs 20, 22, 24, 26, 28 and 30. As previously described, these cooperating VELCRO fasteners serve to removably retain the various stuffed organs within the abdominal cavity of the body 12. These various organs may be selectively removed for instructional purposes. When removed, the various stuffed organs may be placed in their approximately correct relative anatomical locations on the outer surface of the abdominal flap 16 through the use of loop VELCRO fasteners 40.

In FIG. 5, a detail view of a stuffed fabric representation of the animal's lungs is provided.

In FIG. 6, a view of stuffed fabric representations of the animal's kidneys 24 and 30 are provided.

In FIG. 7, a detail view of the stuffed fabric representation 26 of the animal's liver is provided.

In FIG. 8, a stuffed representation 28 of the animal's stomach is provided.

In FIG. 9, a detail view of a stuffed representation 22 of the animal's heart is provided.

Figure 10:
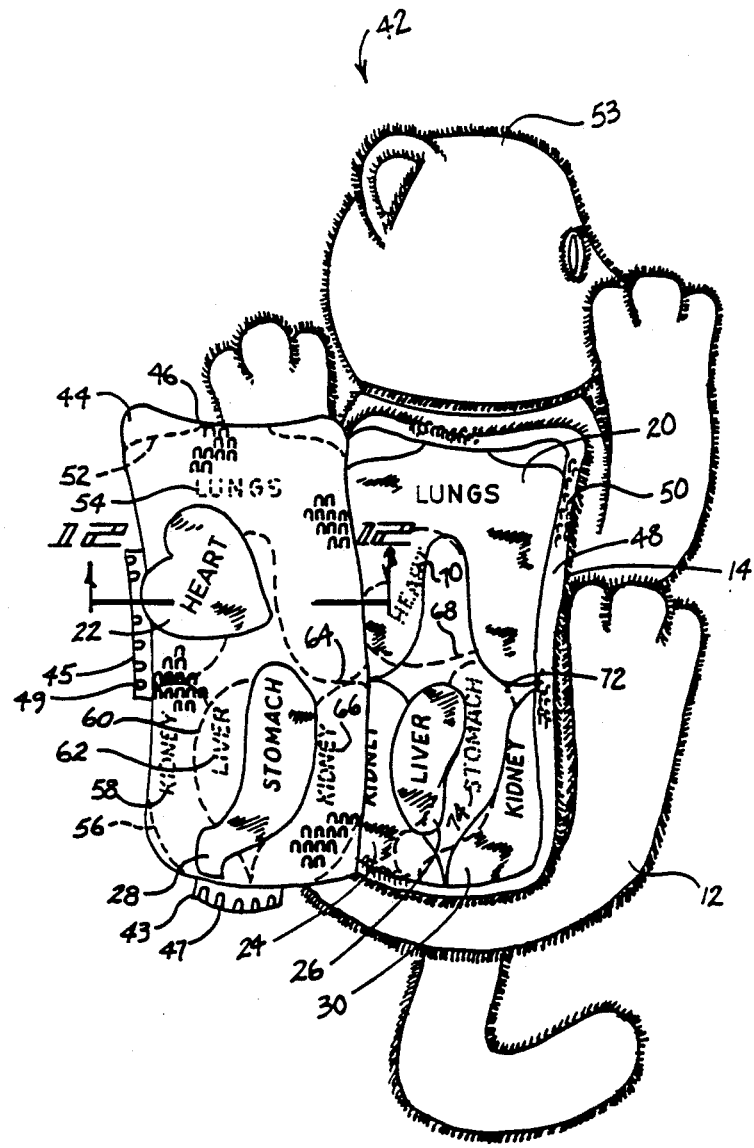
FIG. 10 is a view of the stomach side of the anatomically stuffed toy animal according to a second embodiment of the present invention.

With reference now to FIG. 10, a second embodiment 42 of the present invention will now be described. The anatomically stuffed animal 42 has a head 53 attached to a body portion 12. Stuffed fabric representations of the various internal organs 20, 22, 24, 26, 28 and 30 are received in the hollow abdominal cavity of the body 12, as described in detail with respect to the first embodiment 10 of the present invention. The abdominal cavity in the body 12 is provided with a flap 44. The flap 44 is reversible and has a first side provided with imprinted outlines of the anatomically correct locations of the various internal organs. VELCRO fasteners are positioned within each of these outlines for cooperation with VELCRO fasteners on the back of each of the stuffed organs. The correct position of the lungs 20 is illustrated on the flap 44 by the outline 52 and the imprinted label 54. The heart 22 is shown secured upon the imprinted indicia on the flap 44. The proper location for one kidney is illustrated by the outline 64 and the imprinted label 66. The correct position of the other kidney is indicated by the outline 56 and the label 58. The proper position of the liver is designated by the outline 60 and the label 62. The stomach 28 is illustrated secured in the correct location. As may now be understood, the various stuffed internal organs may be located in their anatomically correct positions within the abdominal cavity, or may be removed and placed in their relative correct anatomical locations on the flap 44. Locating indicia may also be provided on the inner wall of the abdominal cavity as illustrated at 68, 70, 72 and 74. The abdominal cavity opening in the body 12 has a recessed radially extending fabric border strip 48 provided with VELCRO hook fasteners 50. The abdominal flap 44 is provided with radial tabs 43 and 45 having loop VELCRO fasteners 47 and 49. Both sides of each tab 43 and 45 are provided with these loop fasteners. Thus, the tabs 43 and 45 may be folded over either side of the flap 44, and engaged with the cooperating strip 48. This allows the flap 44 to be reversed as desired to allow either side of the flap 44 to face outwardly on the body 12.

Figure 11:
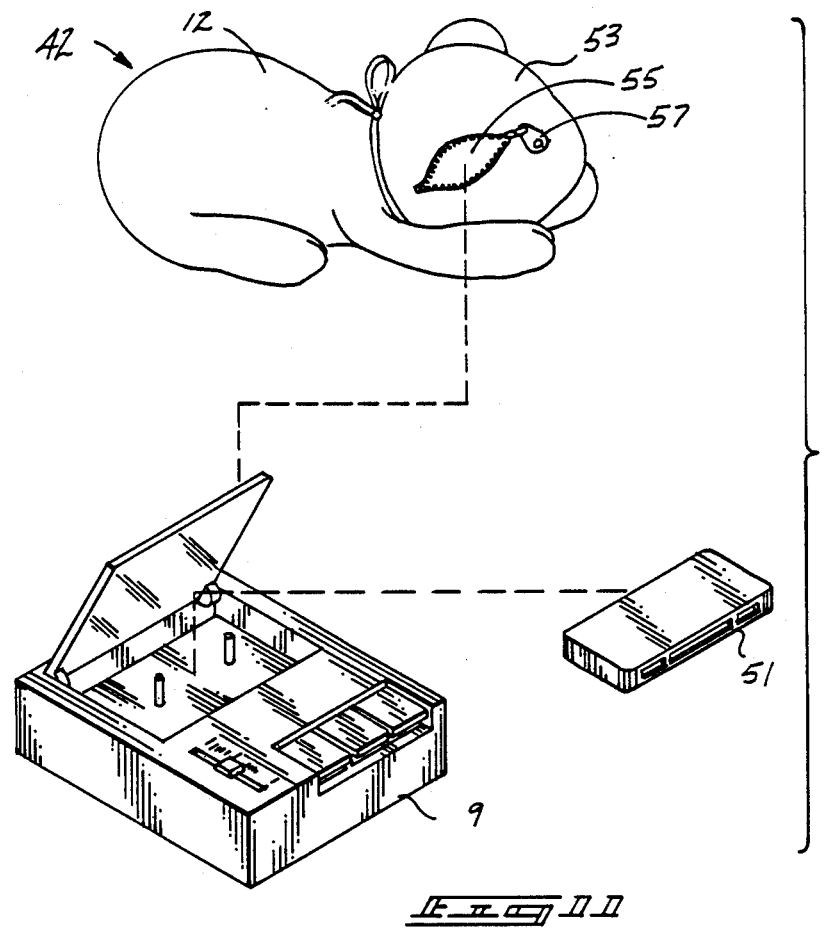
FIG. 11 is an exploded perspective view, illustrating an educational audio tape device adapted to be received in a cavity within the head of the anatomically stuffed toy animal according to the second embodiment of the present invention.

As shown in FIG. 11, the head 53 of the anatomically stuffed animal 42 may be provided with a hollow cavity 55 adapted to be selectively opened or closed by a zipper 57. A conventional audio tape player 59 may be selectively inserted into the cavity 55 for purposes of playing an instructional narrative tape 51. This narrative tape 51 may contain information regarding the various internal organs within the body 12 of the animal 42, and may also contain information regarding the actual live animal's habits and proper care.

Figure 12:
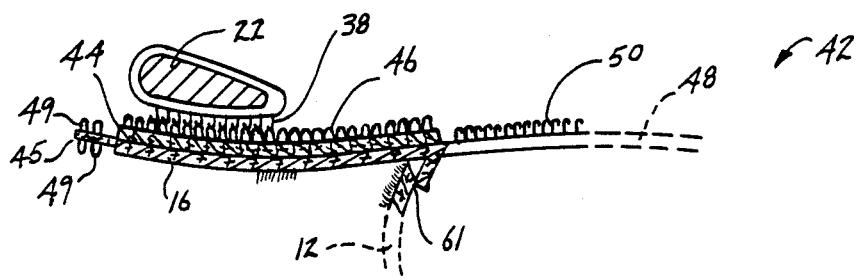
FIG. 12 is a transverse cross sectional view, taken along line 12—12 of FIG. 10, illustrating the construction of the abdominal cavity flap of the anatomically stuffed toy animal according to the second embodiment of the present invention.

In FIG. 12, a cross sectional view taken along line 12—12 on FIG. 10 illustrates the constructional details of the abdominal flap 44. As previously described, the first surface of the flap 44 is provided with loop VELCRO fasteners within the various imprinted indicia. The heart 22 and various other internal organs are provided with cooperating hook VELCRO fasteners 38 for securing the internal organs in their proper locations on the first surface of the abdominal flap 44. The closure tab 45 is provided with loop VELCRO fasteners 49 on both surfaces. Thus, the tab 45 may be folded over the first side of the flap 44 or may be folded over the second side 16 of the flap for purposes of reversibly securing the flap 44 to the closure strip 48 which surrounds the abdominal cavity opening on the body 12. The VELCRO loop fasteners on these closure tabs cooperate with VELCRO hook fasteners 50 on the closure strip 48. The side edge of the flap 44 is secured by a similar closure tab having cooperating VELCRO fasteners to the body 12 at 61. The second surface 16 of the flap 44 is formed from a soft fabric material of the same texture as the main outer fabric covering on the body 12. As may now be understood, the flap 44 may be placed in a first orientation across the abdominal cavity of the body 12, with the side bearing the imprinted organ locating indicia and loop VELCRO fasteners 46 facing outwardly. This allows the various stuffed organs to be placed in their relatively correct anatomical locations for display. Alternatively, the soft second surface 16 of the flap 44 may be disposed outwardly, giving the animal 42 the appearance of a conventional stuffed animal. While the securement of the various organs and the abdominal flap have been described with reference to VELCRO fasteners, which is the preferred method, various other fastening means such as zippers, snaps, cooperating tabs and slots, etc. may be utilized without departing from the scope of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved anatomically stuffed toy animal, comprising:
    an animal shaped body portion formed from a fabric covering filled with a stuffing material;
    a hollow abdominal cavity in said body portion;
    a flap for selectively closing said hollow abdominal cavity;
    fastening means for securing said flap in a closed position;
    a plurality of stuffed fabric internal organs removably received in said abdominal cavity;
    first fastening means on a back surface of each of said internal organs;
    an inner wall of said abdominal cavity provided with cooperating second fastening means for securing said internal organs in anatomically correct locations; and
    imprinted outlines and indicia on said inner wall of said abdominal cavity indicating anatomically correct locations of said internal organs.

2. The anatomically stuffed toy animal of claim 1, further comprising third fastening means on an outer surface of said flap for selectively retaining said internal organs in relative correct anatomical positions on an outer surface of said body portion.

3. A new and improved anatomically stuffed toy animal, comprising:
    an animal shaped body portion formed from a fabric covering filled with a stuffing material;
    a hollow abdominal cavity in said body portion;
    a flap for selectively closing said hollow abdominal cavity;
    fastening means for securing said flap in a closed position;
    a plurality of stuffed fabric internal organs removably received in said abdominal cavity;
    first fastening means on a back surface of each of said internal organs;
    an inner wall of said abdominal cavity provided with cooperating second fastening means for securing said internal organs in anatomically correct locations;
    said flap having a first side provided with a fabric covering matching said fabric covering on said body portion and a second side provided with fastening means for securing said internal organs in anatomically correct locations; and
    means for reversibly securing said flap across said abdominal cavity.

4. The anatomically stuffed toy animal of claim 3, further comprising imprinted outlines and indicia on said surface of said flap for indicating the anatomically correct relative positions of said internal organs.

5. The anatomically stuffed toy animal of claim 4, further comprising a plurality of tabs secured to side edges of said flap, said tabs having fastening means on opposite sides for reversibly securing said flap across said abdominal cavity.

6. The anatomically stuffed toy animal of claim 5, wherein said body portion has an attached head portion having a hollow cavity provided with an audio device for providing an educational narrative.

7. A new and improved anatomically stuffed toy animal, comprising:
    an animal shaped body portion formed from a fabric covering filled with a stuffing material;
    a hollow abdominal cavity in said body portion;
    a plurality of stuffed fabric internal organs imprinted with identifying indicia removably received in said hollow abdominal cavity;
    a flap for selectively closing said hollow abdominal cavity;
    a first side of said flap imprinted with a plurality of outlines and associated indicia designating relative anatomically correct locations of said internal organs;
    cooperating fastening means on said first side of said flap and on a back side of each of said internal organs for securing said internal organs on said first side of said flap;
    a second side of said flap provided with a fabric covering matching said fabric covering on said body portion; and
    means for reversibly securing said flap over said abdominal cavity in said body portion.

8. The anatomically stuffed toy animal of claim 7, wherein said body portion has an attached head portion having a hollow cavity provided with an audio device for providing an educational narrative.

* * * * *